March 22, 1938.  E. C. SHARRAR  2,112,179
ADJUSTABLE GAUGE AND SCRIBER
Filed July 26, 1937
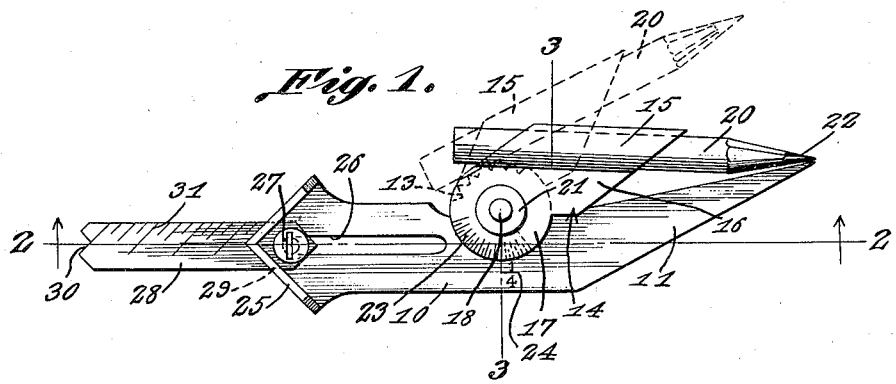
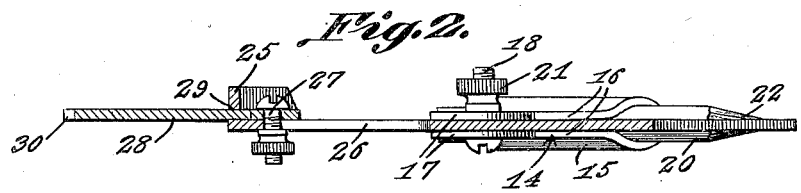
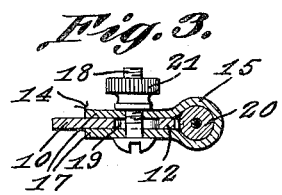
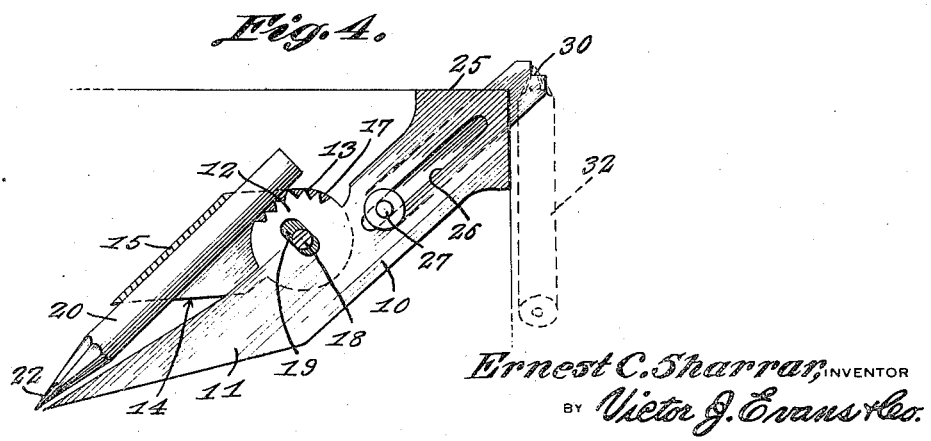
Ernest C. Sharrar, INVENTOR
BY Victor J. Evans & Co.
ATTORNEYS

UNITED STATES PATENT OFFICE 2,112,179

ADJUSTABLE GAUGE AND SCRIBER

Ernest Clyde Sharrar, South Norfolk, Va.

Application July 26, 1937, Serial No. 155,814

1 Claim. (Cl. 33—27)

The invention relates to a scriber and more especially to an adjustable gauge and scriber.

The primary object of the invention is the provision of an instrument of this character, wherein in the use thereof, carpenters, cabinet makers, mill men, ship workers, pattern workers and machinists will be able to make accurate measurements and markings on work, particularly with respect to a marginal measurement and in scribing circles or arcs, the instrument being readily and easily adjusted and avoids the necessity of the use of a straight rule.

Another object of the invention is the provision of an instrument of this character, wherein the marking pencil or the like will be securely held in place and is susceptible of adjustment or replacement, the instrument in its entirety being of novel construction.

A further object of the invention is the provision of an instrument of this character, which is simple in construction, thoroughly reliable and effective in operation, possessed of but few parts, strong, durable, capable of many uses, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a plan view of an instrument constructed in accordance with the invention showing by full lines one position of a marking pencil and by dotted lines another position thereof through adjustment of the instrument.

Figure 2 is a sectional view on the line 2—2 of Figure 1 looking in the direction of the arrows.

Figure 3 is a sectional view on the line 3—3 of Figure 1 looking in the direction of the arrows.

Figure 4 is a plan view showing the instrument set for margin measurement with relation to a piece of work.

Similar reference characters indicate corresponding parts throughout the several views in the drawing.

Referring to the drawing in detail, the instrument constituting the present invention comprises a main body part 10 preferably formed from sheet metal having at one end an outwardly tapered pointed leg 11, being disposed at a lateral angle to the longitudinal extent of the said body part 10 while intermediate of the latter is a substantially half circular wing or ear 12 which protrudes from one side edge of said body part. This wing or ear 12 has cut in the peripheral edge thereof teeth 13 which extend for only a limited distance of said edge.

Swingingly connected to the wing or ear 12 is an adjustable part 14 bent to form a pencil holding barrel 15 and side clamping extensions 16, these being formed with the circular portions 17 accommodating therebetween the wing or ear 12. Centrally mounted with respect to the circular portions 17 is a nut carrying binding screw 18 which is accommodated within an elongated slot 19 provided in said wing or ear 12 and disposed transversely to the longitudinal extent of the body part 10. Telescopically fitted in the barrel 15 is a marking pencil or the like 20 which can be brought into a position for the biting engagement of the teeth 13 therewith through adjustment of the part 14, the nut of the binding screw 18 being indicated at 21 and by the biting engagement of the teeth 13 in the pencil 20 it will be securely held in the barrel 15. This binding screw 18 permits of the angular adjustment of the part 14 with respect to the part 10, the pencil 20 being formed with an outer sharpened end 22 which permits of scribing when the instrument is being used as a compass or in marking of circles upon a piece of work.

Provided on the outer face of one of the circular portions 17 is a scale 23 with which coacts an indicator 24 on the body part 10 so as to enable accurate setting of the pencil 20 or the like with the leg 11 when the instrument is employed as a compass.

Formed on the body part 10 at the other end remote from the leg 11 thereof is a corner square framing flange 25 while longitudinally provided in the body part is a slot 26 for accommodating an adjusting screw 27 connecting a margin measuring rule or blade 28 to the body part. This blade or rule 28 is adapted for sliding movement through a guide opening 29 provided centrally in the framing flange 25 to effect a clearance for the said blade or rule when being adjusted with respect to the body part 10. This blade or rule at its outer end is formed with a notch 30 effecting a seat for a pencil point or other marker when the blade or rule 28 is used for margin measurements. The blade or rule 28 has provided thereon a measuring scale 31, its degree mark or indications being diagonally disposed and accurate measurements may be had through reference thereto in the use of the instrument The instrument is susceptible of many uses and affords a scribing tool or device.

In Figure 4 of the drawing a pencil 32 has its point accommodated in the notch 30 in the blade or rule 28 while the body part 10 is set with respect to a corner of a piece of work for marginal scribing operation.

What is claimed is:

An instrument of the character described comprising a flat body part having an outwardly tapered pointed leg angled to said body part, a pencil holder adjustably connected to the body part and arcuately movable with respect to the leg and also laterally shiftable on the body part, means adjustably connecting the pencil holder to the body part, a pencil held within the holder, and means on the body part for securing the pencil in the holder throughout the range of adjustment of said pencil therein.

ERNEST CLYDE SHARRAR.